(12) United States Patent
Cornelissen et al.

(10) Patent No.: US 7,072,544 B2
(45) Date of Patent: Jul. 4, 2006

(54) POLARIZED LIGHT-EMITTING WAVEGUIDE PLATE

(75) Inventors: Hugo Johan Cornelissen, Eindhoven (NL); Hendrik Johannes Boudewijn Jagt, Eindhoven (NL); Dirk Jan Broer, Eindhoven (NL); Cornelis Wihelmus Maria Bastiaansen, Montfort (NL); Henri Marie Joseph Boots, Eindhoven (NL); Rifat Ata Mustafa Hikmet, Eindhoven (NL); Horst Greiner, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/276,783

(22) PCT Filed: May 8, 2001

(86) PCT No.: PCT/EP01/05262

§ 371 (c)(1),
(2), (4) Date: Sep. 22, 2003

(87) PCT Pub. No.: WO01/90637

PCT Pub. Date: Nov. 29, 2001

(65) Prior Publication Data

US 2004/0105617 A1  Jun. 3, 2004

(30) Foreign Application Priority Data

May 19, 2000  (EP) .................................. 00201762

(51) Int. Cl.
*G02B 6/26* (2006.01)

(52) U.S. Cl. ............................... 385/31; 385/11; 385/15

(58) Field of Classification Search ................... 385/11, 385/31, 901
See application file for complete search history.

(56) References Cited

U.S. PATENT DOCUMENTS

| 5,353,133 | A | * | 10/1994 | Bernkopf ........................ 349/5 |
| 5,477,239 | A | * | 12/1995 | Busch et al. ................. 345/102 |
| 5,808,709 | A | | 9/1998 | Davis et al. ................... 349/65 |
| 5,825,543 | A | | 10/1998 | Ouderkirk et al. ........... 359/494 |
| 5,845,035 | A | | 12/1998 | Wimberger-Friedl ........ 385/129 |
| 5,940,211 | A | | 8/1999 | Hikmet et al. ............... 359/490 |

FOREIGN PATENT DOCUMENTS

WO  WO09732230  9/1997

OTHER PUBLICATIONS

Dirix et al; "Scattering birefringance polarizers based on oriented blends of poly(ethylene terephthalate) and core-shell particles"; Appl. Phys. vol. 83(6) pp. 2927-2933, 1998.

* cited by examiner

*Primary Examiner*—Jennifer Doan

(57) ABSTRACT

A polarized light emitting waveguide plate comprises an entrance side for coupling light into the wave guide plate, a major exit surface for coupling light out of the waveguide plate, and a polarizer for selectively directing a component of a first polarization state of light coupled in via the entrance side towards the exit surface, the polarizer comprising an anisotropically light scattering layer which selectively scatters the component of the first polarization state towards the exit surface. Preferably, the waveguide plate is made of conventionally processed polymeric materials in the form of a laminate of waveguide substrate, anisotropically light scattering layer and, optionally, an optically transparent cover layer.

20 Claims, 6 Drawing Sheets

POLARIZED LIGHT-EMITTING WAVEGUIDE PLATE

Figure 1:
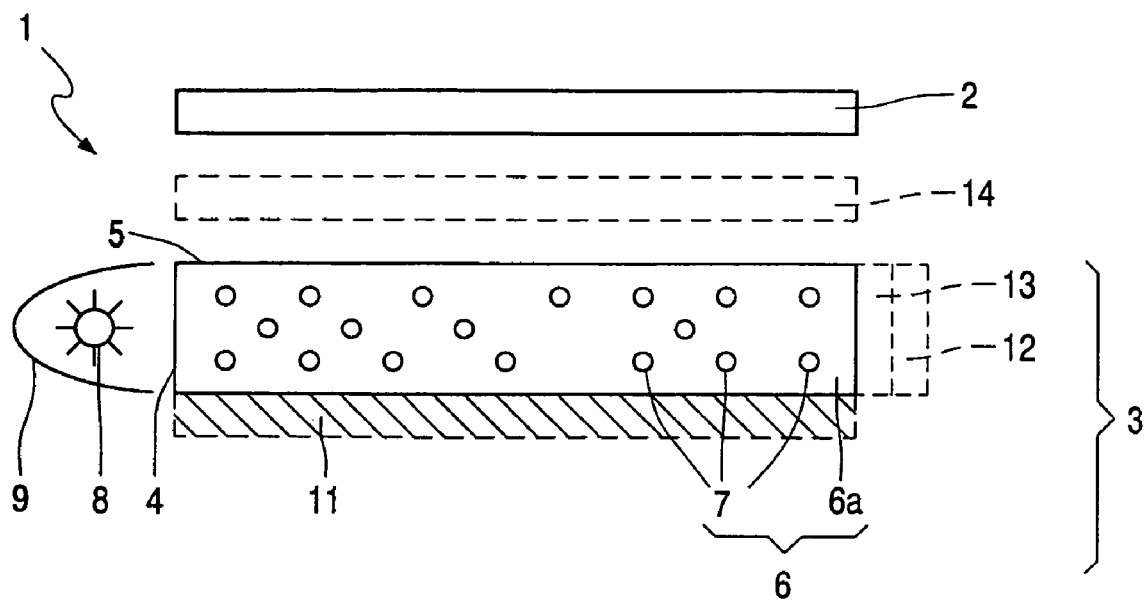

The invention relates to a polarized light emitting waveguide plate comprising an entrance side for coupling light into the waveguide plate, a major exit surface for coupling light out of the waveguide plate, and polarization means for selectively directing light of a first polarization state from the entrance side towards the exit surface.

The invention further relates to an illumination system, a liquid crystal display device and a mobile phone comprising such a waveguide plate.

A waveguide plate of the type mentioned in the opening paragraph is known from U.S. Pat. No. 5,845,035. It comprises a laminate of an isotropic layer with refractive index $n_i$ and an anisotropic layer having refractive indices along two mutually perpendicular directions $n_e$ and $n_o$. By mutually attuning these refractive indices polarization separation takes place at the interface between the two layers. A drawback of the known waveguide plate is that the light coupled out the waveguide via the exit surface leaves the waveguide at angles which are at least as large as (measured from the normal of the exit surface) the critical angle for total internal reflection for the reflected component of polarization. Thus, the angular distribution of emitted light is severely skewed to directions far from the desired direction for illuminating display panels, which is normal to the exit surface. Furthermore, if the waveguide is made of optically isotropic material its refractive index has to match the maximum of the refractive indices of the anisotropic layer. This condition limits the choice of suitable materials from which the isotropic layer can be suitably made, in particular if an organic material such as a polymer is to be used.

A similar waveguide having similar drawbacks is disclosed in U.S. Pat. No. 5,808,709. Moreover, the waveguide disclosed therein requires a reflector for coupling out the light towards the LCD panel as an essential feature which adds to the complexity of the waveguide.

It is an object of the invention to provide a polarized light emitting waveguide plate which does not have these drawbacks or at least to a lesser extent. In particular it is an object to provide a polarizing light emitting polarizer having a favorable angular distribution of emitted light and a high polarization selectivity.

This object is achieved by a polarized light emitting waveguide plate of the type mentioned in the opening paragraph which is characterized in that the polarization means comprise an anisotropically light scattering layer which selectively scatters light of the first polarization state towards the exit surface.

Since the light is directed towards the exit surface by means of scattering instead of transmission as in the known waveguide of U.S. Pat. No. 5,845,035, the angular distribution of the light emitted is more oriented towards the normal of the exit surface which is advantageous when the waveguide plate is used in an LCD device.

The waveguide plate in accordance with the invention is capable of emitting highly polarized light with high brightness. Typically, light coupled out via the exit surface has a polarization selectivity, averaged over all angles, of at least 6 to 8. Along the normal of the exit surface the selectivity is 15.0 or higher.

In the context of the invention, a polarized light emitting waveguide is a waveguide which selectively emits light of a first polarization state with respect to light of a second polarization state orthogonal to said first polarization state.

The polarization selectivity of the emitted light is defined as the ratio of the amount of light emitted of a first polarization state to the amount of light emitted of a second polarization state orthogonal to said first polarization state.

The transmissivity of the waveguide plate is the ratio of the amount of light emitted via the exit surface to the amount of light entered via the entrance side.

Furthermore, polarization selection takes place in the bulk of the anisotropically scattering layer instead of at an interface between layers. Therefore, proper polarization selection is directly linked to the optical quality of the interface.

Since the waveguide plate does not contain any light-absorbing components the transmissivity of the waveguide plate can in principle be 100% which renders the waveguide plate very energy-efficient. Moreover, since the light source which provides the light to the waveguide is located next to the waveguide a compact illumination system is obtained. Thus the waveguide plate is particularly suitable for use in (displays for) battery operated equipment such as a mobile phone, a palm computer, a lap top computer, a personal organizer. Furthermore, it does not heat up during use which is of advantage when used in combination with a high power light source as used in for example projection display devices. If used in combination with a dichroic polarizer to enhance the polarization selectivity even further, less heat is developed as well in the dichroic polarizer.

The incident light coupled in via the entrance side of the waveguide plate is guided through the plate by total internal reflection in directions more or less parallel to the exit surface. Generally, this incident light is substantially unpolarized, that is it contains components of the first and the second polarization state in equal amounts. As this light travels through the anisotropically scattering layer, the component of the first polarization state is scattered to a larger extent than the component of the second polarization state. Conversely, the component of the second polarization state is transmitted to a larger extent than the first component, that is the second component is selectively transmitted and hence remains captured in the waveguide plate. Scattered light traveling towards the exit surface and incident on the exit surface with an angle not satisfying the condition for total internal reflection will be refracted and exit the waveguide plate via the exit surface. An article by Dirix et al in J. Appl. Phys. Vol. 83(6) pp 2927–2933, 1998 discloses a back light system comprising a reflector, a waveguide plate, a diffusor and an anisotropically light scattering polarizer in the form of separate mutually detached components. Due to the diffusor, the light emitted by the waveguide plate is incident on the polarizer at substantially right angles. The component of the first polarization state is selectively transmitted by the polarizer and the component of the second polarization is selectively back-scattered. The back-scattered light of the second polarization is again offered to the polarizer by the reflector.

The waveguide plate in accordance with the invention is capable of providing a higher transmissivity and/or selectivity because the light of the second polarization state being offered again to the polarizing means is reflected using total internal reflection, a process of near 100% efficiency whereas Dirix et al use a reflector. The reflectivity of such a reflector is significantly less than 100%. For example, the reflectivity of an aluminum reflector is about 90%.

In U.S. Pat. No. 5,940,211 a back-light system similar to that of Dirix et al having similar drawbacks is disclosed.

WO 97/32230 discloses an optical film for use as a light extractor in a light guide in the form of a fiber. The optical film is applied as a cladding and upsets the waveguiding property of the fiber thereby ejecting light to the surroundings. The fiber may be used in remote lighting applications. The optical film can be made to extract a single polarization of light, thereby creating a polarization-specific light source. WO 97/32230 does not disclose a polarized light emitting waveguide in the form of a plate next to which a light source is arranged in order to couple in light from the entrance side. Neither does it disclose a liquid crystal display comprising such a waveguide plate.

The thickness of the waveguide plate is attuned to the amount of light needed for a particular application at hand and the size of the light source used to provide light to the waveguide plate. If the plate is too thin, the light incoupling is less efficient, whereas if it is too thick weight is added unnecessarily. Conveniently, the thickness is between 0.1 and 50 mm, or better 0.25 to 10 mm. A good balance between efficient incoupling and weight of the plate is struck at a thickness of 0.5 mm to 5 mm. A waveguide plate for a mobile phone is typically 0.5 to 2 mm.

In order to illuminate a display panel of an LCD device comprising the waveguide plate in accordance with the invention efficiently, the transmissivity of the waveguide plate with respect to the component of the first polarization state (that is the component to be coupled out via the exit surface) in the direction of waveguiding may be selected such that any light which reaches the side opposite from the entrance side comprises to some extent said component of the first polarization.

A preferred embodiment of the invention is characterized in that the anisotropically light scattering layer comprises a continuous phase and a disperse phase dispersed in and/or co-continuous with the continuous phase, the refractive index of the continuous and the disperse phase being substantially mismatched along a first axis and substantially matched along a second axis of the anisotropically light scattering layer.

The size of the domains of the dispersed phase is selected such that the material is capable of scattering light. Typically, the size should be at least a tenth of the wavelength of the light to be scattered or better between 0.1 and 10 μm.

In order to scatter the light of a particular polarization state efficiently, a mismatch in refractive index between the continuous and disperse phase along the direction of that polarization state is required. Conversely, in order to transmit light of a particular polarization the refractive index along that direction should be substantially matched. A substantial mismatch corresponds to a difference in refractive index of at least 0.05, or better at least 0.1 or better still, at least 0.15. Two refractive indices are substantially matched if their difference is less than 0.05, or better less than 0.02, or better still less than 0.01.

Thus in order to selectively scatter the p-polarized component of the light incident from an entrance side of the waveguide plate, the refractive index normal to the exit surface is to be mismatched and the index parallel to the exit surface matched. Selective scattering of s-polarized light requires a mismatch in a direction parallel to the exit surface and a match normal to the exit surface.

In a particular embodiment of the waveguide plate in accordance with the invention, the anisotropically light scattering layer comprises an optically isotropic continuous phase and an optically anisotropic disperse phase.

The isotropic continuous phase is preferably polymeric. Suitable polymers include thermosetting and thermoplastic polymers which may be (semi)-crystalline or amorphous. Examples include PMMA (polymethyl methacrylate), PS (polystyrene), PC (polycarbonate), COC (cyclic olephine copolymers), PES (polyether sulphone) but also crosslinked acrylates, epoxides, urethane and silicone rubbers.

An anisotropic disperse phase is suitably made of an oriented liquid crystalline material. To achieve macroscopic orientation along a desired direction, the material is subjected to an electric or a magnetic field at an appropriate stage of its manufacture. Alternatively, shear induced alignment may be used. Preferably, a polymer dispersed liquid crystal (PDLC) material is used. A convenient method to permanently fix the macroscopic orientation is in situ cross-linking of polymerizable LC monomers. The desired distribution of the disperse phase can be achieved by admixing the disperse phase material in the polymer matrix or admixing in the monomer matrix. If a monomer matrix is used, the phase separation may be induced by polymerization of the matrix (generally PDLC materials are made in this manner) or by polymerization of the reactive LC molecules. Further examples are disclosed in U.S. Pat. No. 5,940,211 column 8, lines 44–62.

In a preferred embodiment, the anisotropically light scattering layer comprises an optically anisotropic polymeric continuous phase and an optically isotropic polymeric disperse phase dispersed in and/or co-continuous with said continuous phase.

The continuous phase is preferably a polymeric material. The isotropic dispersed phase may be both inorganic such as glass and the like or organic. Preferred is a polymeric disperse phase. Preferred disperse phases are core-shell particles for example those of the cross-linked type such as cross-linked styrene-butadiene core covered with a thin PMMA shell or thermoplastic styrene-(meth)acrylate copolymers.

The anisotropic continuous phase is preferably a birefringent polymeric phase. Such a birefringent phase has an extraordinary refractive index $n_e$ along its optical axis and an ordinary refractive index $n_o$ along the axes orthogonal thereto. Dependent on the particular material $n_e > n_o$ or $n_e < n_o$.

The combination of a birefringent continuous phase having refractive indices $n_o$ and $n_e$ and an isotropic disperse phase with index $n_d$ allows a number of different configurations. Either $n_e$ is matched to $n_d$ or $n_o$ is matched to $n_d$.

If $n_o$ is matched to $n_d$ and $n_e$ is mismatched with $n_d$, the direction corresponding to the index $n_e$ may be parallel to the normal of the entrance side of the waveguide plate. However, polarization selection then only occurs for light rays which make an angle with said normal. Preferably, the index $n_e$ is selected orthogonal to the normal of the entrance side. If additionally $n_e$ is orthogonal to the exit surface, that is a homotropic alignment, p-polarized light is selectively scattered and s-polarized selectively transmitted and trapped in the waveguide. If $n_e$ is parallel to both the entrance side and the exit surface, s-polarized is selectively scattered.

Examples of suitable anisotropic continuous phase materials include LC polymers and amorphous/semi-crystalline polymers such as PMMA (polymethyl methacrylate), PS (polystyrene), PC (polycarbonate), COC (cyclic olephine copolymers), PES (polyether sulphone). These polymers can be made birefringent using conventional polymer processing methods such as extrusion. In a final stage of their preparation, the polymer films are stretched to a specific draw ratio to obtain desired refractive indices $n_e$ and $n_o$, $n_e$ being in the direction of stretching. Dependent on the particular stretching conditions, the material is slightly biaxial in the sense that that the refractive indices along the axes orthogonal to the drawing direction are slightly different, say about 0.03. A preferred continuous phase material is poly(ethylene terephthalate).

Further examples of suitable materials for the continuous polymeric birefringent phase and the isotropic disperse phase and combinations of such continuous and disperse phases as well as methods of preparing layers of said materials are disclosed in U.S. Pat. No. 5,825,543 column 12 line 50 to column 14 line 67. Further examples of such materials are disclosed in U.S. Pat. No. 5,940,211, column 8 line 63 to column 9, line 46. Particularly preferred are thermoplastic polymeric continuous phase comprising core shell particles as the disperse phase.

The weight fraction of the disperse phase is 0.5 to 50 wt. % or preferably 1 to 20 wt. %.

A preferred embodiment of the waveguide plate in accordance with the invention is characterized in that the anisotropically light scattering layer has a birefringent continuous phase and a scattering thickness factor $\delta$ satisfying $0.1$ $\mu m<\delta<10.0$ $\mu m$ and defined as $\delta=d.c.\Delta n$, wherein d is the thickness of the anisotropically light scattering layer measured in micrometers, c is the weight fraction of the disperse phase and $\Delta n$ is the maximum difference in refractive index along two mutually perpendicular axes of the continuous phase.

Within the range specified for $\delta$, the light coupled out via the exit surface has a favorable angular distribution in that light is substantially coupled out at small angles w.r.t the normal of the exit surface. If $\delta<0.1$ $\mu m$, the angle at which polarized light leaves the exit surface (measured with respect to the normal) is unfavorably large. On the other hand, anisotropically light scattering layers in which $\delta>10.0$ $\mu m$ are difficult to manufacture. In particular, problems at the drawing stage in the process of manufacturing of polymeric anisotropically light scattering layers are expected due to the large thickness of the layer and/or high concentration of the disperse phase.

In general, not all the scattered light of the first polarization state is scattered towards the exit surface but also in other directions. Thus, in order to increase its transmissivity and/or its polarization selectivity, a particular embodiment of the waveguide plate comprises or is combined with means for redirecting scattered light towards the exit surface. Redirecting means which depolarize incident light upon redirection such as a diffusive reflector can be suitably used. However, the polarization selectivity is improved if the redirecting means preserve or enhance the polarization state of the scattered light. Examples of such means are a metallic reflector or a reflective polarizer such as a cholesteric polarizer.

Depending on the particular properties of the waveguide such as its dimension and transmissivity in the direction of waveguiding, a fraction of the light of the second polarization state which is coupled in from an entrance side may reach a side opposite thereof. In order to increase the polarization selectivity and/or transmissivity of the waveguide plate in this situation, the waveguide plate comprises or is used in combination with means for redirecting the transmitted light into the waveguide plate. Preferably, the means are provided on waveguide plate.

Suitable such redirecting means include means for reflecting any light which reaches a side opposite from the side which it entered such as a mirror. Generally, a reflector depolarizing the light upon reflection such as a diffusely reflecting metallic surface may be suitably used. Alternatively or additionally, means to convert light of the second polarization state orthogonal to the first polarization state to the first orthogonal state are provided on or arranged near the side from which the transmitted light exits. An example of such means is a quarter wave plate used in combination with a reflector arranged such that the transmitted light traverses the quarter wave plate twice.

A particular embodiment of the waveguide plate is characterized in that waveguiding substantially takes place within the anisotropically scattering layer. By limiting the waveguiding to the anisotropically scattering layer the effect of polarized light emission is achieved using a single layer thus keeping the number of parts of the waveguide plate and optical assemblies comprising such as waveguide plate to a minimum. Since the anisotropically scattering layer provides the waveguiding function as well, its thickness should at least be 0.1 mm or preferably at least 0.2 mm or better still at least 0.5 mm in order to couple in the light from the entrance side effectively. In order to provide mechanical support the layer may be provided on a substrate.

Another particular embodiment of the waveguide plate in accordance with the invention is characterized in that the waveguide plate comprises a waveguide substrate onto which the anisotropically scattering layer is laminated.

This embodiment has the advantage that the anisotropic light scattering layer can be a thin foil instead of a thick plate of at least 1 mm. Suitably, the anisotropically light scattering layer has a thickness of 1 to 500 $\mu m$, preferably 10 to 300 $\mu m$ or better still 20 to 200 $\mu m$.

Use of a such a thin foil cuts down on the cost of anisotropic material. Moreover, thin foils can be mass-produced more easily. In particular, thin polymeric layers can be more easily and cost-effectively produced using an extrusion process on conventional equipment than thick plates. A further advantage is that the waveguide substrate can be manufactured of an optically isotropic material. Optically isotropic materials are more cost-effective and better suited to post-processing such as polishing to obtain optically smooth surfaces than anisotropic materials. Moreover, the substrate can be manufactured using injection-molding. A complex three-dimensional shape implementing means for assembly or securing the waveguide plate in on onto a bigger assembly may be incorporated.

The exit surface of the waveguide plate the exit surface may be located on the side of the substrate facing away from the anisotropically scattering layer. Alternatively, the exit surface is located on the side of the scattering layer facing away from the substrate. The exit surface may be a surface of the anisotropically light scattering layer.

Suitable isotropic materials for the substrate include glass and transparent ceramics. Preferably, however the waveguide substrate is made of a transparent polymer which may be thermosetting or thermoplastic. Suitable polymers include thermosetting and thermoplastic polymers which may be (semi)-crystalline or amorphous. Examples include PMMA (polymethyl methacrylate), PS (polystyrene), PC (polycarbonate), COC (cyclic olephine copolymers), PES (polyether sulphone) but also crosslinked acrylates, epoxides, urethane and silicone rubbers. The polymers mentioned above suitable for the anisotropic phase may also be used for the isotropic phase provided they are processed to obtain them in the optically isotropic state.

In order to ensure that waveguiding is not limited to the waveguide substrate but light is also admitted to the anisotropically light scattering layer, the refractive index of the substrate $n_s$ is selected smaller than the smallest refractive index of the anisotropically light scattering layer.

In a preferred embodiment, the waveguide plate satisfies $n_{c2} < n_s < n_{c1}$, wherein $n_{c1}$ is the refractive index of the anisotropic continuous phase in the direction of the axis along which the refractive index of the continuous phase and the disperse phase are substantially matched, $n_{c2}$ is the refractive index of the anisotropic continuous phase in the direction of the axis along which the refractive index of the continuous phase and the disperse phase are substantially mismatched, and $n_s$ is the refractive index of the waveguide substrate.

This relationship among the refractive indices being satisfied, total internal reflection occurs at the interface between the substrate and the anisotropically light scattering layer for the polarization component which is substantially transmitted by the anisotropically light scattering layer. Thus, this polarization component is effectively prevented from entering the scattering polarizer film when the angle of incidence of light on the interface is higher or equal to the critical angle. As the light is then perfectly trapped in the waveguide substrate, the waveguide plate is less vulnerable to reductions in polarization selectivity due to imperfections in the anisotropically light scattering layer.

The layers of the laminate may be bonded together by providing a layer of adhesive. The refractive index of the adhesive is selected such that it does not interfere with the functioning of the waveguide plate. This is achieved in a waveguide plate which satisfies $n_s \leq n_g \leq n_a$, wherein $n_s$ is the refractive index of the waveguide substrate, $n_g$ is the refractive index of the adhesive, and $n_a$ is the smallest refractive index of the anisotropically light scattering layer.

The surface(s) of the anisotropically light scattering layer, in particular if the anisotropically light scattering layer comprises an anisotropic polymeric continuous phase obtainable by for example stretching an extruded film, can have a roughness to an extent that the condition of total internal reflection of the light of the second polarization state is partially upset. Thus the amount of light of the second polarization state transmitted within the waveguide is reduced and the amount coupled out via the exit surface increased. In other words, the polarization selectivity is reduced.

Therefore, in order to improve the polarization selectivity, an embodiment of the waveguide plate in accordance with the invention is characterized in that the surface of the anisotropically light scattering cover layer facing away from the waveguide substrate is covered with an optically transparent layer. The optically transparent layer takes out the roughness of the anisotropically light scattering layer by substantially reducing the mismatch in refractive index between air and the anisotropically light scattering layer. The depolarizing effect of the surface roughness is substantially reduced and the polarization selectivity substantially improved.

In particular, the optically transparent cover layer has an axis along which the refractive index is substantially matched with the refractive index of the continuous phase and the disperse phase of the anisotropically light scattering layer.

Preferably, both major surfaces of the anisotropically light scattering layer are covered with such a layer, the waveguide substrate serving as one of these layers. If the substrate and anisotropically light scattering layer are bonded together, the adhesive also serves to take out any roughness of the anisotropically light scattering layer surface.

The cover layer is conveniently made of an optically isotropic material, such a polymer. In particular, the polymers mentioned hereinabove in regard the anisotropically light scattering layer and the waveguide substrate are suitable. The cover layer can be suitable made in a conventional manner by applying a monomer or prepolymer composition onto the surface of the anisotropically light scattering layer and then polymerizing. As an example, the adhesive suitable to bond together a waveguide substrate and anisotropically light scattering layer is processed in this manner. Alternatively, the waveguide plate may be manufactured by insert injection molding, the anisotropically light scattering layer serving as the insert.

Another advantageous embodiment of the waveguide plate in accordance with the invention is characterized in that the waveguide plate is wedge-shaped. As a result of the wedge-shape more light is directed to the exit surface and less in the direction of waveguiding thus improving the transmissivity of the waveguide plate for light traveling from the entrance side to the exit surface. Also, the distribution of the light leaving via the exit surface is influenced in the sense that relatively more light is directed to the exit surface the further away from the side the light enters the waveguide. This effect is particularly advantageous if used in combination with the anisotropic scattering layer since the wedge shape compensates for light lost earlier in the waveguide plate by previous scattering events.

The wedge-shape may be combined with a waveguide plate substantially consisting of anisotropic material. Alternatively, in embodiments involving a waveguide substrate the substrate can be wedge-shaped. The wedge-shape may be conveniently manufactured using injection-molding or other techniques for forming polymer bodies.

Yet another embodiment of the waveguide plate in accordance with the invention is characterized in that the exit surface is structured for controlling the amount and/or angular distribution of the light leaving the waveguide plate via the exit surface at a particular position.

The exit surface may be structured in the form of a relief pattern or structured in the form of a substantially planar surface demonstrating a patchwork pattern of areas having different optical properties.

If the surface is provided with a relief pattern comprising features the size of which are at least about a tenth of the wavelength of the light, the fraction of the light incident on the exit surface which does not satisfy the condition for total internal reflection, and consequently the amount of light emitted, is increased.

Alternatively, relief patterns comprising features substantially less than one tenth of the wavelength will be perceived by the light incident on the exit surface as a homogeneous area of different refractive index. This difference alters the condition of total internal reflection. This relief pattern may in itself again be provided in accordance with a pattern having features substantially larger than one tenth of the wavelength of the light incident on the exit surface. An example is a substantially planar exit surface provided with dots in accordance with a pattern, each dot having a roughened surface such that light scattered by the dot is not depolarized.

The exit surface may be structured in the form of a microlens array in order to collimate the light which leaves the waveguide plate or provided with a prismatic relief pattern.

A preferred structured exit surface has a structure demonstrating a gradient in outcoupling efficiency in order to compensate for the loss of light experienced in moving further away form the side or sides at which the light is coupled in.

As an alternative or in addition to the structured exit surface a diffusor layer or plate may be disposed on near the exit surface for obtaining a more homogeneous distribution of light exiting the exit surface. Conventional diffusors which depolarize the incident light are not suitable.

In another aspect, the invention relates to an illumination system comprising a waveguide plate in accordance with the invention and a light source arranged near an entrance side thereof.

The waveguide plate is used in combination with a light source for coupling in the light from an entrance side thereof. The light sources generally include a back reflector.

Suitable light sources for waveguide plates to be used in hand-held and/or battery-operated display applications such as a mobile phone, a palm top computer, or a personal organizer and the like are light emitting diodes and cold cathode fluorescent lamps. These light sources consume little power, typically from 20 mW to 2 W. Suitable light sources for desk-top applications such as a computer monitor are 2 to 20 W cold cathode fluorescent lamps. The size of the waveguide plate which can be effectively used in combination with these light sources is typically 20 to 70 cm in diagonal.

The illumination system may comprise more than one light source. The light sources may be arranged at one or more sides of the waveguide plate in which case the waveguide plate has one or more entrance sides. Examples of suitable illumination systems are shown in FIGS. 3a–d of U.S. Pat. No. 5,845,035. Particularly preferred are combinations where the light sources are arranged on opposite sides because then the back reflectors of the light sources also serve as reflector for light transmitted by the waveguide of the opposite light source.

The invention also relates to a liquid crystal display device. In accordance with the invention, the liquid crystal device is characterized in that it comprises an illumination system in accordance with the invention. The LC display device comprises an LC display panel having one or more LC cells. The cell may be of the twisted nematic (TN), supertwisted nematic (STN), ferroelectric or any other conventional LC cell type.

The display device may be a segmented passive matrix, or active matrix LCD device.

The use of the waveguide plate in accordance with the invention allows the light source of a back lit flat panel LC display device to be arranged on a side thereof instead of behind the display panel, thus arriving at an LC device more compact in the viewing direction. This compact arrangement is particularly advantageous in hand held equipment such as a mobile phone, a palm top computer, a personal organizer and the like.

Particularly preferred is a mobile phone provided with an illumination system or LCD device in accordance with the invention.

These and other aspects of the invention will be apparent from and elucidated with reference to the embodiments described hereinafter.

Figure 2:
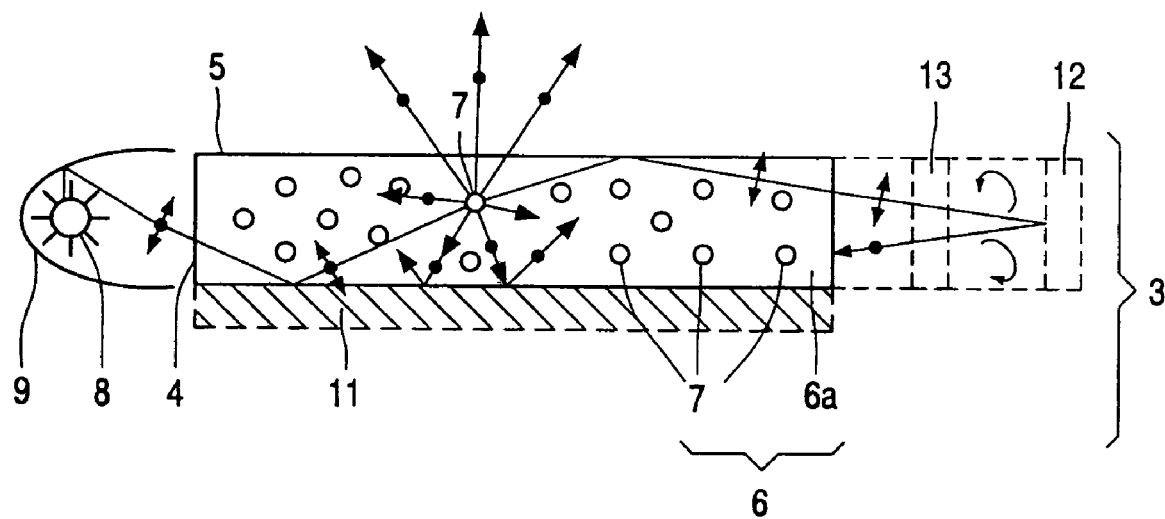
Figure 6:
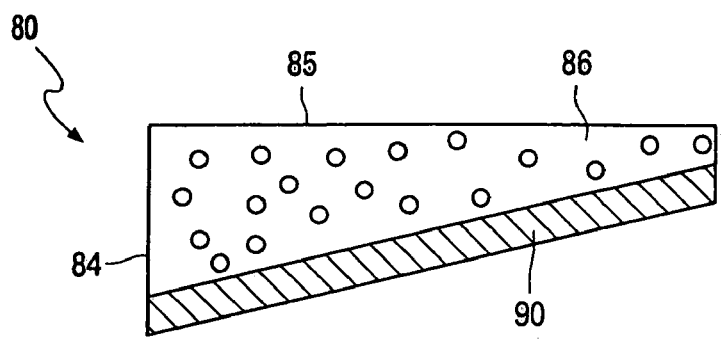
Figure 7:
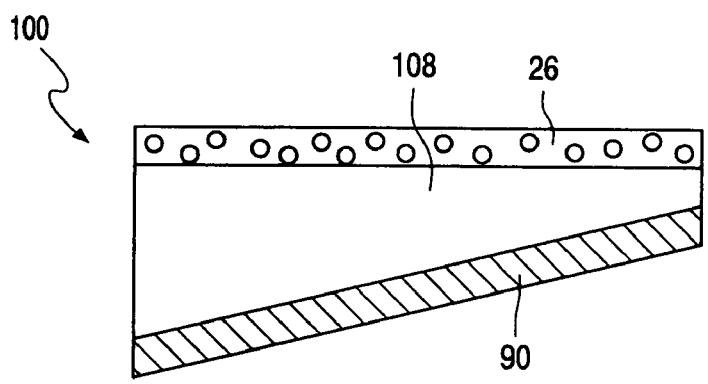
Figure 8:
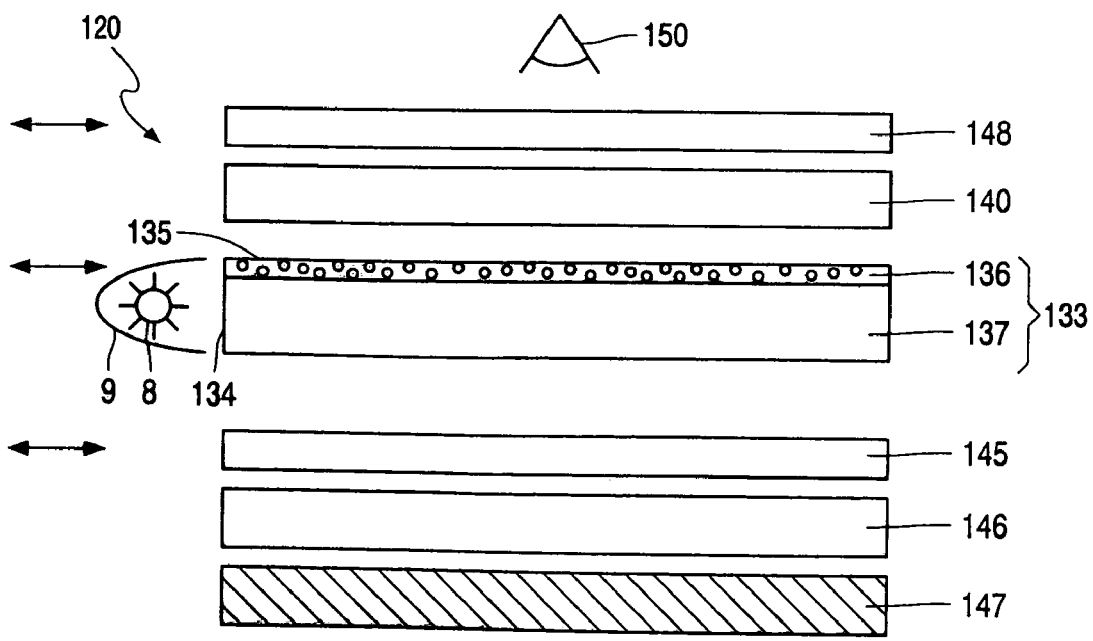
Figure 9:
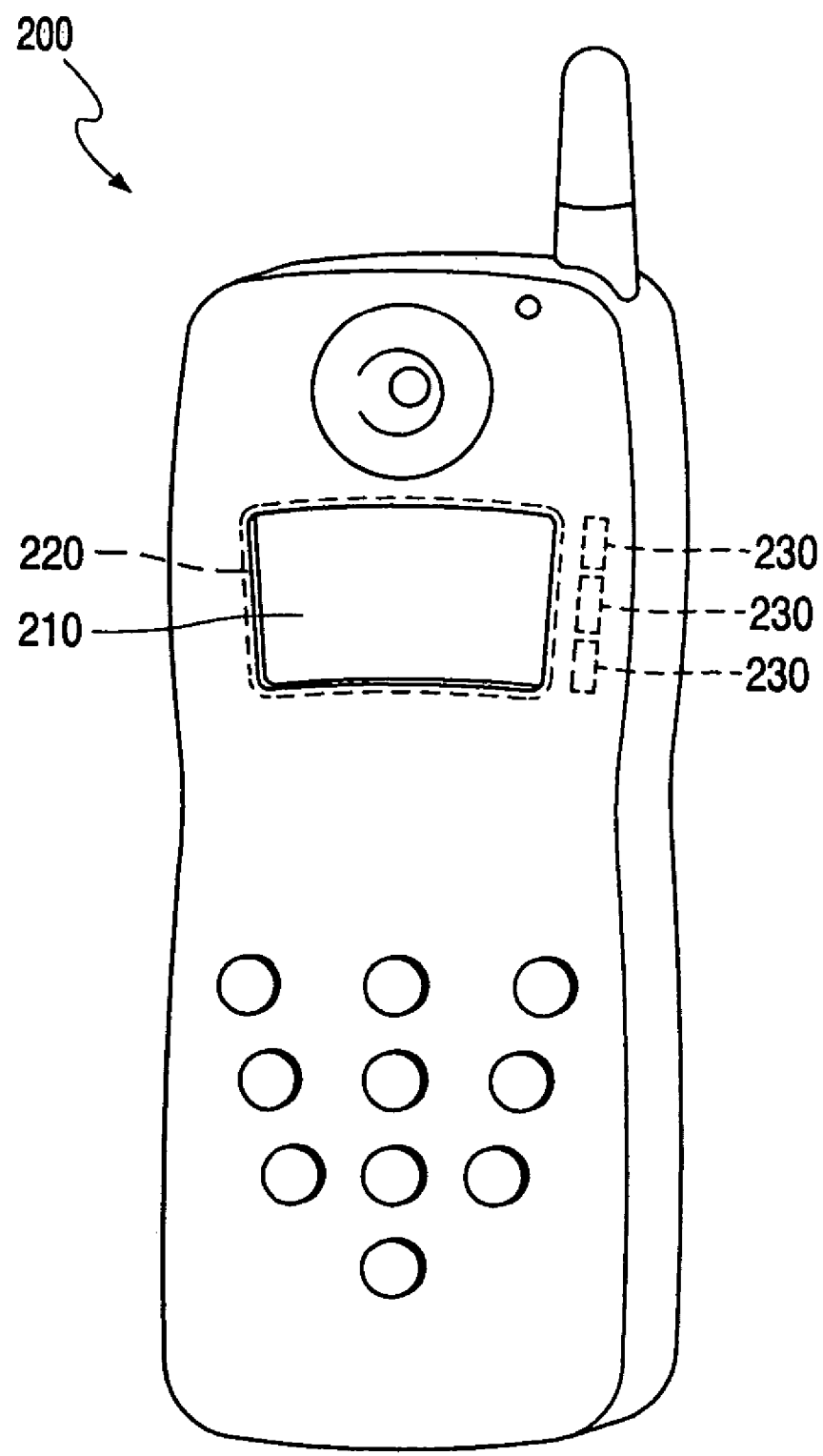
Figure 10:
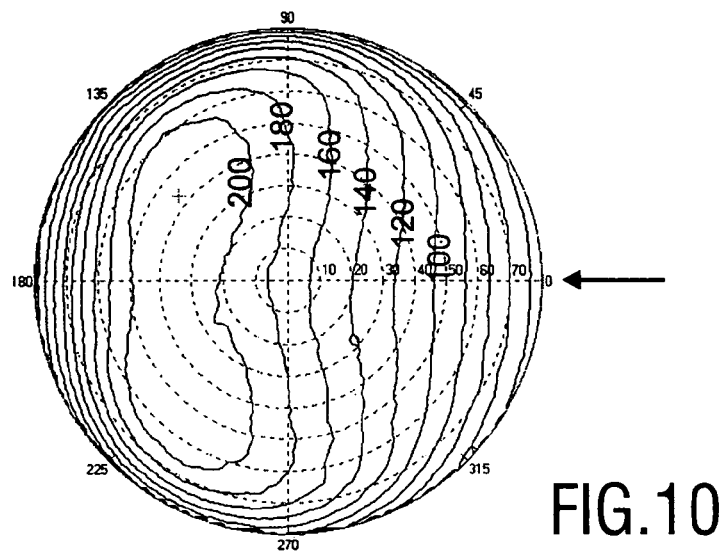
Figure 11:
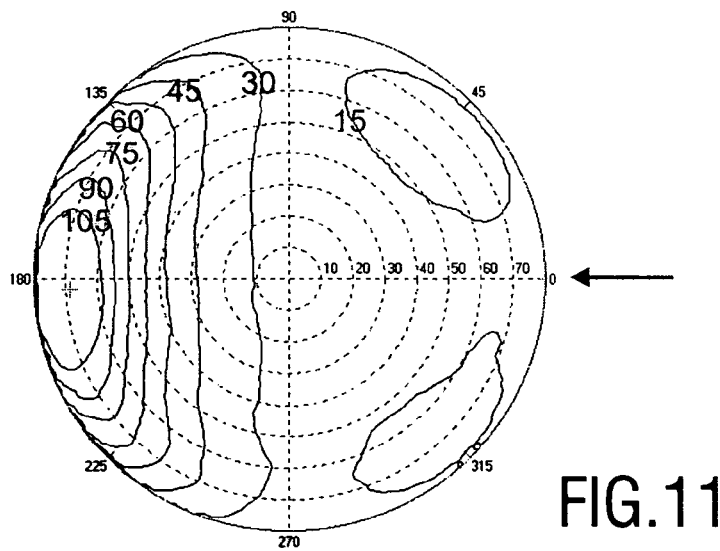
Figure 12:
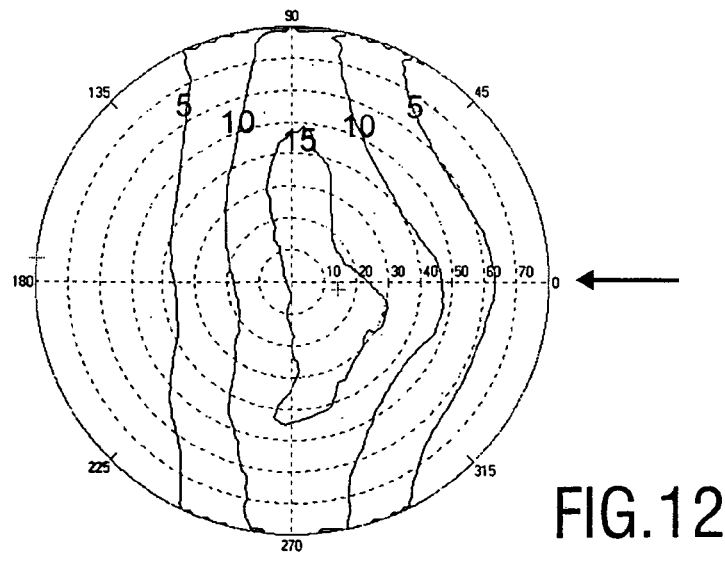
Figure 13:
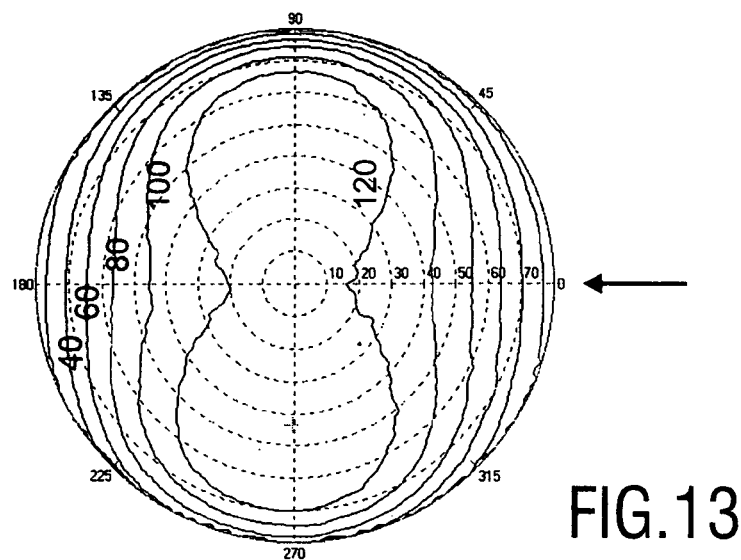
Figure 14:
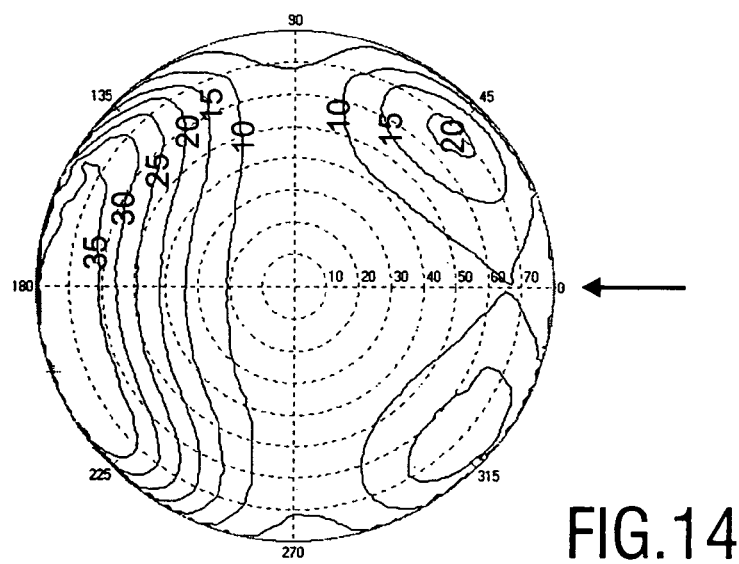
Figure 15:
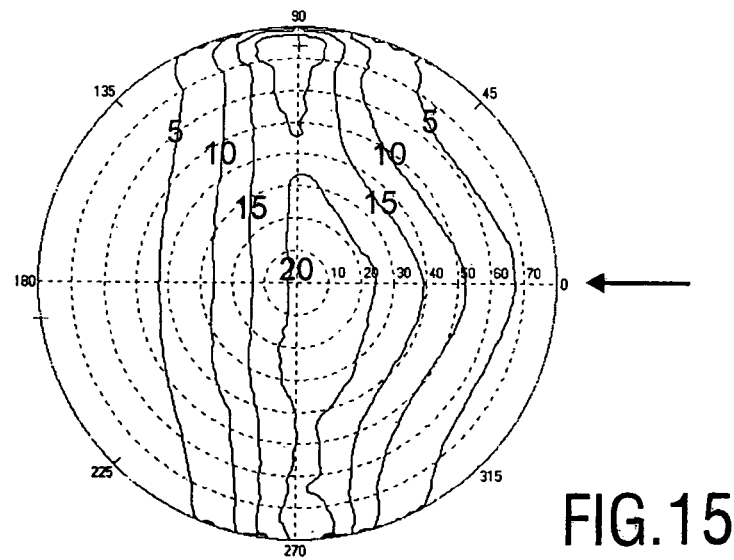

In the drawings:

FIG. 1 schematically shows in a cross-sectional view a liquid crystal display device comprising a first embodiment of a waveguide plate in accordance with the invention, FIG. 2 schematically shows typical trajectories of polarization components of light rays traveling through a waveguide plate in accordance with the invention, FIGS. 3 to 7 schematically show in cross-sectional views, further embodiments of illumination systems and waveguide plates in accordance with the invention, FIG. 8 schematically shows, in a cross-sectional view, a liquid crystal display device of the transflective type comprising a waveguide plate in accordance with the invention, FIG. 9 schematically shows, in a frontal view, a mobile phone comprising an LCD device and a waveguide plate in accordance with the invention, FIGS. 10–12 show contour plots of the angular distribution of, respectively, the luminance of s-polarized light (in $cd/m^2$), the luminance of p-polarized light (in $cd/m^2$) and polarization selectivity (in dimensionless units) emitted by an exemplary waveguide plate in accordance with the invention, and FIGS. 13–15 show contour plots of the angular distribution of, respectively, the luminance of s-polarized light (in $cd/m^2$), the luminance of p-polarized light (in $cd/m^2$) and polarization selectivity (in dimensionless units) emitted by a second exemplary waveguide plate in accordance with the invention.

FIG. 1 schematically shows in a cross-sectional view a liquid crystal display device comprising a first embodiment of a waveguide plate in accordance with the invention.

The liquid crystal display device 1 comprises a display panel 2 and arranged substantially parallel thereto, a waveguide plate 3 in accordance with the invention.

The waveguide plate 3 has an entrance side 4 for coupling in light provided by the light source 8 fitted with reflector 9 and a major exit surface 5 for coupling out polarized light. The waveguide plate 3 comprises polarization means for selectively directing a component of a first polarization state of light coupled in via the entrance side 4 towards the exit surface 5 in the form of an anisotropically light scattering layer 6 which selectively scatters the component of the first polarization state towards the exit surface 5. The layer 6 comprises a continuous phase 6a in which a disperse phase 7 is dispersed. The refractive indices of the continuous and disperse phase are attuned to one another such that along a first axis orthogonal to the direction of waveguiding (normal of the entrance side 4) the refractive index of the disperse phase and the continuous phase are substantially mismatched, whereas along a second axis orthogonal to both the direction of waveguiding and said first axis the refractive index is substantially matched. Alternatively, the first axis may be oriented parallel to the normal of the entrance side 4 or the normal of the exit surface 5. The waveguide plate 3, light source 8 and reflector 9 together form an illumination system in accordance with the invention.

Optionally, the waveguide plate 3 is provided with reflector 11 for redirecting any scattered light incident thereon towards the exit surface 5. The reflector may be provided as a separate element or integrated as shown. The reflector may be a metallic reflector which maintains the polarization of the incident light on reflection. Alternatively, a reflective polarizer or cholesteric mirror may be used. Also, a depolarizing reflector such as a strongly diffusive metallic reflector may be used.

Also optionally, the waveguide plate 3 is provided with a reflector 12 for redirecting any light transmitted by the waveguide plate into waveguide plate. The reflector 12 may be a diffuse metallic reflector depolarizing the light on reflection. Alternatively, the reflector may preserve the polarization state of the incident light thereon. In the latter case a quarter wave plate 13 may be arranged between the reflector 12 and the layer 6 which has the effect of inverting the polarization state of any light which traverses it twice.

The quarter wave plate 13 and reflector 12 may also be provided as separate components detached from the waveguide plate 3.

If desired, a dichroic polarizer 14 is arranged between the waveguide plate 3 and the panel 2 to further enhance the polarization selectivity.

The LCD device will generally comprise further components (not shown) such as a dichroic polarizer arranged on the side of the panel 2 facing away from the waveguide plate 3 to analyze the picture information to be displayed.

FIG. 2 schematically shows typical trajectories of polarization components of light rays traveling through a waveguide plate in accordance with the invention.

A light ray of unpolarized light comprising equal amounts of s- and p-polarized light enters the waveguide plate 3 via the entrance side 4 at an angle larger (measured w.r.t. the normal of the exit surface 5) than the critical angle and is therefore totally internally reflected at the interface opposite the exit surface 5. While traveling through the continuous phase 6a of the anisotropically light scattering layer 6 it encounters a disperse phase area 7. The refractive index of the disperse phase 7 for p-polarized light is substantially matched to that of the continuous phase 6a of the anisotropically light scattering layer 6 and thus the p-polarized component is substantially transmitted. The refractive index of the disperse phase 7 for s-polarized light is mismatched with that of the continuous phase 6a. The mismatch results in scattering of the incoming light ray into a bundle of scattered light rays at least a fraction of which is directed towards the exit surface 5. Polarization selection is thus obtained. The particular angular distribution of the scattered light rays depends on the properties of the specific anisotropically light scattering layer 6. Scattered light rays traveling away from the exit surface 5 are reflected if the reflector 11 is present. Depending on the particular properties of the reflector, the thus reflected light contains s- and/or p-polarized components. The transmitted p-polarized light ray is waveguided further through the waveguide plate 3. Due to imperfections in the continuous phase 6a, the p-polarized ray will depolarize as it travels through the waveguide plate thus making it possible to obtain further polarization selection as a consequence of a further scattering event. If the p-polarized light ray would reach the side opposite the entrance surface 4 it may be reflected by reflector 12 optionally used in combination with the quarter wave plate 13 and guided back into the waveguide. Depending on the particular reflection properties of the reflector and/or waveguide the thus reflected light ray contains components of s- and/or p-polarization.

Figure 3:
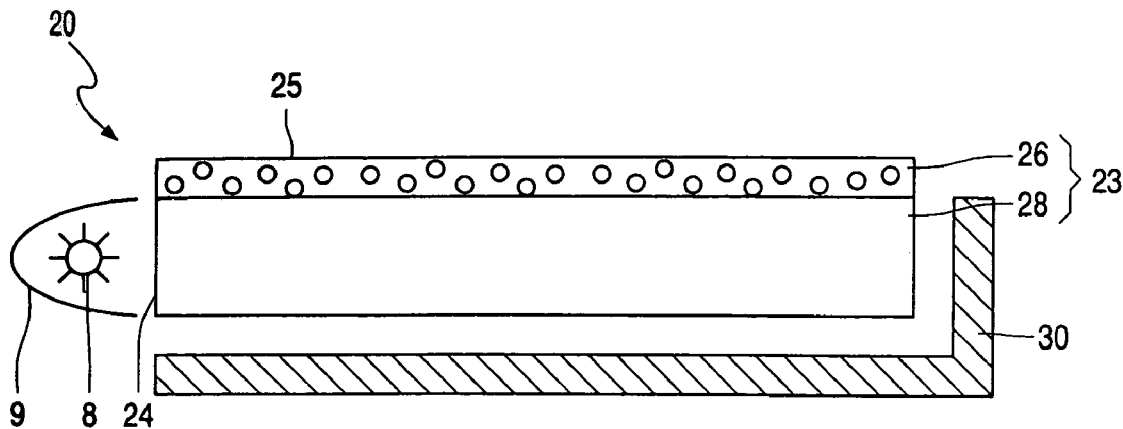

FIG. 3 schematically shows in a cross-sectional view a second embodiment of a waveguide plate in accordance with the invention.

The waveguide plate 23 is part of the illumination system 20 which further comprises a light source 8 with reflector 9. The waveguide plate 23 is a laminate of waveguide substrate 28 and an anisotropically light scattering layer 26.

In this and any further embodiment comprising such a laminate, a layer of adhesive (which is not shown and not essential for the invention) may be provided between the substrate 28 and the layer 26.

The waveguide plate 23 has an entrance side 24 which, depending on the particular arrangement of the reflector 9, may or may not, in addition to the side of the waveguide substrate 28, include the side of the anisotropically light scattering layer 26. In either case, since the entrance side 24 is substantially formed by the side of the waveguide substrate 28, the thickness of the anisotropically light scattering layer 26 can be substantially less than the thickness of the anisotropically light scattering layer 6 of FIG. 1 which by itself serves as the entrance side 4 of the waveguide plate 3.

The illumination system 20 further comprises a reflector 30 which in this second embodiment is provided in the form of a separate element detached from the waveguide plate 23.

If the refractive index of the waveguide substrate 28 is smaller than the smallest refractive index of the anisotropically light scattering layer 26, the exit surface 25 serves as the interface at which total internal reflection takes place instead of the interface between substrate 28 and layer 26 for both the first and second state of polarization. If only the light of the polarization to be emitted via the exit surface is to be admitted to the anisotropically light scattering layer 26, the refractive index of the substrate 28 is to be selected smaller than the refractive index of the continuous phase 6a along the axis along which the refractive index of the continuous phase 6a and the disperse phase 7 are mismatched and larger along the matched axis.

Figure 4:
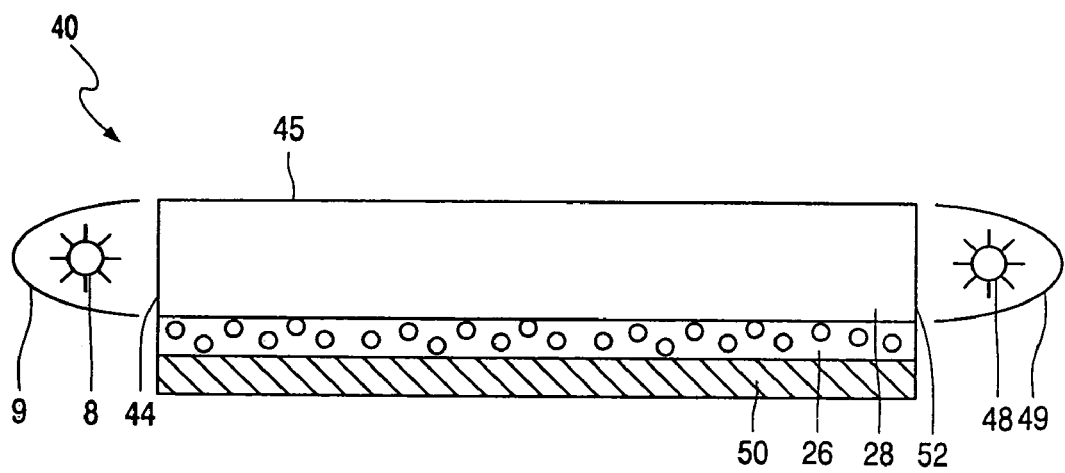

FIG. 4 schematically shows, in a cross-sectional view, a third embodiment of an illumination system and waveguide plate in accordance with the invention.

The illumination system 40 comprises a light source 8 with reflector 9 for providing light which can enter the waveguide plate 43 via the entrance side 44. The surface of the waveguide substrate 28 facing away from the anisotropically light scattering layer 26 serves as the exit surface 45 of the waveguide plate 43. A reflector 50 is laminated on the anisotropically light scattering layer 26. The illumination system 40 comprises a further light source 48 with reflector 49 for providing light to a further entrance side 52. The reflector 49 (i.c. 9) also serves as a reflector for any light which has entered the waveguide plate 43 via the entrance side 44 (i.c. 52) and left the waveguide plate via entrance side 52 (i.c. 44).

Figure 5:
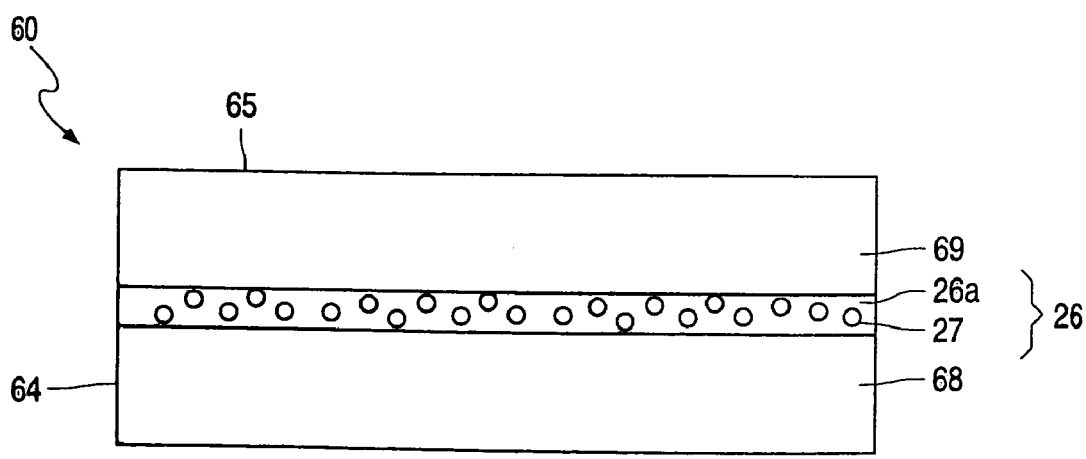

FIG. 5 schematically shows, in a cross-sectional view, a fourth embodiment of a waveguide plate in accordance with the invention.

The waveguide plate 60 comprises an anisotropically light scattering layer 26 disposed laminated onto a waveguide substrate 68. In addition an optically transparent cover layer 69 covers the anisotropically light scattering layer 26 thus providing an exit surface 65. The cover layer 69 substantially takes away any roughness of the surface of the anisotropically light scattering layer 26 thus improving the polarization selectivity.

In particular, the cover layer 69 has an axis along which the refractive index is substantially matched with the refractive index of the continuous phase 26a and the disperse phase 27 of the anisotropically light scattering layer 26.

Depending on the particular arrangement of the light source (not shown) the entrance side 64 may or may not include the cover layer 69.

Optionally, the exit surface 45 or 65 is relief patterned in order to manipulate the distribution of light emitted as a function of the distance from the entrance side 64 and/or the angular distribution of the light emitted at particular locations of the exit surface. The relief pattern may be a prismatic relief pattern or triangular or cylindrical ridges extending substantially parallel to the entrance side 64.

FIG. 6 schematically shows, in a cross-sectional view, a fifth embodiment of a waveguide plate in accordance with the invention.

The waveguide plate 80 has a wedge-shaped anisotropically light scattering layer 86 and an entrance side 84 via which light from a light source can enter the waveguide plate. Due to the wedge-shape, the angle of incidence on the interface of a light ray traveling down the waveguide plate 80 decreases as it moves further away from the entrance side 84. As a result, relatively more light is coupled out via the exit surface 85 as the distance from the entrance side 84 increases. The distribution of light emitted via the exit surface 85 is further modulated by the reflector 90.

FIG. 7 schematically shows, in a cross-sectional view, a sixth embodiment of a waveguide plate in accordance with the invention. The waveguide plate 100 comprises a wedge-shaped waveguide substrate 108 on one side of which a anisotropically light scattering layer 26 is laminated and on another side thereof a reflector 90.

FIG. 8 schematically shows, in a cross-sectional view, a liquid crystal display device of the transflective type comprising a waveguide plate in accordance with the invention.

The transflective LCD device 120 comprises an LCD panel 140 which, in general includes an LC cell dispersed between transparent ITO electrodes. The device 120 further comprises an illumination system of a light source 8 with reflector 9 for providing light to the entrance side 134 of a waveguide plate 133 in accordance with the invention. The waveguide plate 133 has a waveguide substrate 137 onto which an anisotropically light scattering layer 136 is laminated for selectively directing polarized light to the exit surface 135. The LCD device 120 further comprises a dichroic polarizer 145, a diffusor 146 and a reflector 147. An analyzer/polarizer 148 is arranged between the viewer 150 and the panel 140.

The LCD device 120 is reflective in that it is capable of displaying picture information using ambient light. As is well known in the art, depending on the particular LC cell used and mutual orientation of the analyzer 148 and the polarizer 145 different LC effects can be obtained. In the following it is assumed that the polarizers are oriented in parallel and the LC cell is of the twisted nematic type. With no voltage on a pixel of the panel 140, ambient light which enters the device from the viewing side indicated by the viewer 150 is polarized by the analyzer 148. As it passes the LC cell the polarization of the light is turned by 90°. The transmitted light passes the waveguide plate 133 and is absorbed by the polarizer 145: the pixel appears dark. With the pixel in the on state, the polarization of the light is not changed and thus it is able to pass the polarizer 145 unhindered. The light is reflected by the mirror 147 and travels the way back in the same manner reaching the viewer 150: the pixel appears white. Due to the small thickness of the anisotropically light scattering layer 136 loss of ambient light due to scattering in this layer is negligible.

If the available ambient light is not sufficiently bright to afford comfortable viewing, the illumination system is switched on and the panel 140 is lit (also) from behind by means of the illumination system comprising the waveguide plate 133 and light source 8. The anisotropically light scattering layer 133 provides light polarized in the direction of the transmission direction of the analyzer/polarizer 148 and is guided through the display 120 in the same manner as ambient light.

Although the panel 140, waveguide plate 133, polarizer 145, diffusor 146 and reflector 147 are shown as separate mutually detached components they may be laminated together to form an integral whole. Also, other embodiments of the waveguide plate in accordance with the invention such as those shown if FIG. 3-7 may be suitably used.

FIG. 9 schematically shows, in a frontal view, a mobile phone comprising a LCD device and a waveguide plate in accordance with the invention.

The mobile phone 200 comprises an LCD device 210 and a wave guide plate 220 in accordance with the invention. The waveguide plate 220 is lit from the side by the light sources 230.

EXAMPLE 1

An example of the waveguide plate 60 (FIG. 5) is manufactured using commercially available polymers. The material of the continuous phase of the anisotropically light scattering layer 26 consists of poly(ethylene terephthalate) (PET) (Arnite™ D02 300, AKZO Nobel, The Netherlands) and the dispersed phase of Core-Shell (CS) cross-linked particles of styrene-butadiene core, polymethylmethacrylate shell 200 nm in diameter as available from Röhm and Haas, Paraloid EXL 3647™.

An amount of PET (90 wt %) and CS (10 wt %) material is blended and extruded at a temperature of 270° C. on a counter-rotating twin-screw extruder and a film is formed from the extrudate on a cast-film extrusion line operated at 270° C. A strip cut from the film is then stretched in a tensile tester to a draw ratio of 4.5 resulting in an anisotropically light scattering layer 26 having a length of 33 mm, a width of 22 mm and a thickness of 80 µm, the length corresponding to the drawing direction.

As a result of the stretching, the continuous phase 26a of the strip and thus the anisotropically light scattering layer 26, becomes birefringent.

The refractive index in the direction of drawing corresponds to the extraordinary index $n_e$ and measures 1.680, whereas the ordinary refractive index $n_o$ is 1.535, resulting in birefringence Δn of 0.145. The disperse phase 27 is isotropic and has a refractive index $n_d$ of 1.530.

The scattering thickness δ of the anisotropically light scattering layer is 80*0.10*0.145=1.16 µm.

The anisotropically light scattering layer 26 thus obtained is laminated onto a 1 mm thick 35 by 50 mm polymethyl-methacrylate (PMMA) waveguide substrate 68. The wave guide substrate has a refractive index of 1.49. Lamination is effected by using UV-curable diacrylate adhesive which has, after curing, a refractive index substantially matched to the ordinary refractive index of the continuous PET phase. The anisotropically light scattering layer 26 is provided on the substrate 68 such that its stretching direction is at right angles to the normal of the entrance side 64. The same adhesive is also used to provide an optically transparent cover layer 69. Thus the layer 69 has a refractive index which is substantially matched to the refractive index $n_o$ of the PET continuous phase, which index is matched to the index of the disperse phase.

Uncollimated, unpolarized white light from a cold cathode fluorescent lamp (CCFT) with reflector is coupled into the waveguide substrate via the entrance side 64.

Since the refractive index along the stretching direction is significantly mismatched ($n_e-n_d$=0.145), the light polarized along this direction is scattered.

Because the stretching direction is substantially parallel to the entrance side 64 (and exit surface 65), the scattered light is s-polarized.

Since the refractive index along the direction at right angles to the stretching direction is substantially matched ($n_o-n_d$=0.005), the light polarized along this direction, i.e. the p-polarized component, is substantially transmitted.

Using an Eldim EZ Contrast 160R conoscope with a spot-size of 166 µm in diameter, the angular distribution of light emitted by the waveguide plate 68 via the exit surface 65 is measured for the s- and p-polarized light components separately at azimuthal angles of 0° to 360° and inclination angles from −80° to +80°, where an inclination angle of 0° corresponds to the direction normal to the waveguide plate 68 and the azimuthal angle is measured in the plane of the waveguide plate.

FIGS. 10–12 show contour plots of the angular distribution of, respectively, the luminance of s-polarized light (in cd/m$^2$), the luminance of p-polarized light (in cd/m$^2$) and polarization selectivity (in dimensionless units) emitted by the waveguide of this example.

FIG. 10 shows the angular distribution of the luminance of s-polarized light (in cd/m$^2$) as a function of the spherical angular co-ordinates in the form of contours on a polar plot. The angle of the polar plot corresponds to the azimuthal angle (in degrees) and its radius to the inclination angle (in degrees). The arrow indicates the direction at which the light is coupled into the waveguide plate and corresponds to an azimuthal angle of 0°. The centre of plot corresponds to the normal of the exit surface 65.

The luminance of s-polarized light is highest in the area delimited by 135° to 225° azimuthal angle and 30° to 50° inclination angle confirming that the waveguide plate scatters s-polarized light due to the refractive index mismatch along this direction. The illuminance of s-polarized light, averaged over all azimuthal and inclination angles, is 480.2 lm/m$^2$.

FIG. 11 shows a similar polar plot of the luminance of p-polarized light. As evidenced by the contours of low intensity, much less p-polarized light is emitted via the exit surface. This is consistent with the substantially matched refractive index along this direction ($n_o-n_d$=0.005), as a result of which p-polarized light is substantially transmitted and trapped in the waveguide.

Moreover, any p-polarized light which does exit the waveguide plate via the exit surface does so at very steep inclination angles, 70° or more. This outcoupling of p-polarized light is due to the very slight mismatch in refractive index along the direction of p-polarized light and optical imperfections of the continuous phase. Light entering the waveguide plate may travel as much as the full width of the waveguide plate within before exiting it, therefore a very slight mismatch in refractive index along the direction of p-polarized light will result in some outcoupling of p-polarized light via the exit surface 25. This is in contrast to the polarizers of Dirix et al in which the light only transects the polarizer at right angles limiting the distance traveled to about 1 mm maximum.

The illuminance of p-polarized light, averaged over all azimuthal and inclination angles, is 76.5 lm/m$^2$.

FIG. 12 show a similar polar plot of the polarization selectivity. The highest polarization selectivities are found near the center of the plot. The selectivity along the normal of the exit surface 65 is about 15.5.

The polarization selectivity, averaged over all azimuthal and inclination angles, is 6.3.

FIGS. 10–12 clearly demonstrate that the s-polarized light is selectively scattered towards the exit surface 65 and the p-polarized component is selectively transmitted with high polarization selectivity and a favorable angular distribution.

EXAMPLE 2

Example 1 is repeated with the difference that the light scattering layer 26 consists of 95 wt. % PET/5 wt. % CS material and has a length and width of 8 mm and a thickness of 360 μm.

The refractive indices are identical to those given above. The scattering thickness δ of the anisotropically light scattering layer 26 is however 360*0.05*0.145=2.61 μm.

FIGS. 13–15 show contour plots of the angular distribution of, respectively, the luminance of s-polarized light (in cd/m$^2$), the luminance of p-polarized light (in cd/m$^2$) and polarization selectivity (in dimensionless units) emitted by the waveguide of this example.

Referring to FIG. 13, the light distribution of the scattered s-polarized light is centered around the center of plot which corresponds to the normal of the exit surface 25. This shows that the increase of scattering thickness δ compared to example 1 orients the angular distribution of emitted polarized light more in the direction of the normal of the exit surface 25.

In contrast, as shown in FIG. 14 any p-polarized light which is coupled out via the exit surface is predominantly coupled out at very steep inclination angles, 70° or more.

The illuminance of emitted s-polarized light, averaged over all angles, is 338.0 lm/m$^2$ and of p-polarized light is 38.5 lm/m$^2$ resulting in an average polarization selectivity of 8.8 clearly demonstrating that s-polarized is selectively directed towards and emitted via the exit surface 25.

As evidenced by FIG. 15, the highest polarization selectivities are found along the direction normal to the exit surface 65 and typically amount to about up to 22.

FIGS. 13–15 clearly demonstrate that the s-polarized light is selectively scattered towards the exit surface 65 and the p-polarized component is selectively transmitted with high polarization selectivity and a favorable angular distribution. Compared to Example 1, the angular distribution is even more favorable as it is substantially centered along the normal of the exit surface 65.

EXAMPLE 3

Example 1 and 2 are repeated except that the optically transparent layer 69 is left out. The polarization selectivity is significantly reduced.

The invention claimed is:

1. A polarized light emitting waveguide plate comprising:
an entrance side for coupling light into the waveguide plate,
a major exit surface for coupling light out of the waveguide plate, and
a polarizer that is configured to selectively direct light of a first polarization state from the entrance side towards the exit surface, wherein
the polarizer includes an anisotropically light scattering layer that selectively scatters light of the first polarization state towards the exit surface.

2. The waveguide plate of claim 1, wherein
the anisotropically light scattering layer includes:
a continuous phase, and
a disperse phase dispersed in and/or co-continuous with the continuous phase,
a refractive index of the continuous and the disperse phase being substantially mismatched along a first axis and substantially matched along a second axis of the anisotropically light scattering layer.

3. The waveguide plate of claim 2, wherein
the anisotropically light scattering layer includes:
an optically anisotropic polymeric continuous phase, and
an optically isotropic polymeric disperse phase dispersed in and/or co-continuous with the continuous phase.

4. The waveguide plate of claim 3, wherein
the continuous phase is a poly(ethylene terephthalate).

5. The waveguide plate of claim 4, wherein
the waveguide plate includes a waveguide substrate onto which the anisotropically light scattering layer is laminated, and
the waveguide plate satisfies $n_{c2}<n_s<n_{c1}$, wherein
$n_{c1}$ is the refractive index of the anisotropic continuous phase in a direction of the second axis,
$n_{c2}$ is the refractive index of the anisotropic continuous phase in a direction of the first axis, and
$n_s$ is the refractive index of the waveguide substrate.

6. The waveguide plate of claim 3, wherein
the waveguide plate includes a waveguide substrate onto which the anisotropically light scattering layer is laminated, and
the waveguide plate satisfies $n_{c2}<n_s<n_{c1}$, wherein
$n_{c1}$ is the refractive index of the anisotropic continuous phase in a direction of the second axis,
$n_{c2}$ is the refractive index of the anisotropic continuous phase in a direction of the first axis, and
$n_s$ is the refractive index of the waveguide substrate.

7. The waveguide plate of claim 6, wherein
a surface of the anisotropically light scattering layer facing away from the waveguide substrate is covered with an optically transparent cover layer.

8. The waveguide plate of claim 3, wherein
the anisotropically light scattering layer has a scattering thickness factor $\delta = d.c.\Delta n$ satisfying 0.1 µm<δ<10 µm,
wherein d is a thickness of the anisotropically light scattering layer measured in micrometers, c is a weight fraction of the disperse phase and Δn is a maximum difference in refractive index along two mutually perpendicular axes of the continuous phase.

9. The waveguide plate of claim 8, wherein the waveguide plate includes a waveguide substrate onto which the anisotropically light scattering layer is laminated.

10. The waveguide plate of claim 9, wherein
the waveguide plate includes a waveguide substrate onto which the anisotropically light scattering layer is laminated, and
the waveguide plate satisfies $n_{c2}<n_s<n_{c1}$, wherein
$n_{c1}$ is the refractive index of the anisotropic continuous phase in a direction of the second axis,
$n_{c2}$ is the refractive index of the anisotropic continuous phase in a direction of the first axis, and
$n_s$ is the refractive index of the waveguide substrate.

11. The waveguide plate of claim 3, wherein
the waveguide plate includes a waveguide substrate onto which the anisotropically light scattering layer is laminated.

12. The waveguide plate of claim 2, wherein
the anisotropically light scattering layer has a scattering thickness factor $\delta = d.c.\Delta n$ satisfying 0.1 µm<δ<10 µm,
wherein d is a thickness of the anisotropically light scattering layer measured in micrometers, c is a weight fraction of the disperse phase and Δn is a maximum difference in refractive index along two mutually perpendicular axes of the continuous phase.

13. The waveguide plate of claim 12, wherein
the waveguide plate includes a waveguide substrate onto which the anisotropically light scattering layer is laminated.

14. The waveguide plate of claim 12, wherein
the waveguide plate includes a waveguide substrate onto which the anisotropically light scattering layer is laminated, and
the waveguide plate satisfies $n_{c2}<n_s<n_{c1}$, wherein
$n_{c1}$ is the refractive index of the anisotropic continuous phase in a direction of the second axis,
$n_{c2}$ is the refractive index of the anisotropic continuous phase in a direction of the first axis, and
$n_s$ is the refractive index of the waveguide substrate.

15. The waveguide plate of claim 2, wherein
the waveguide plate includes a waveguide substrate onto which the anisotropically light scattering layer is laminated.

16. The waveguide plate of claim 1, wherein
the waveguide plate includes a waveguide substrate onto which the anisotropically light scattering layer is laminated.

17. The waveguide plate of claim 16, wherein
a surface of the anisotropically light scattering layer facing away from the waveguide substrate is covered with an optically transparent cover layer.

18. An illumination system comprising a waveguide plate as claimed in claim 1 and a light source arranged near an entrance side thereof.

19. A liquid crystal display device, in particular of the transflective type, comprising an illumination system as claimed in claim 18.

20. A mobile phone provided with an illumination system as claimed in claim 18.

* * * * *